United States Patent
Hollemann et al.

(10) Patent No.: US 7,286,576 B2
(45) Date of Patent: Oct. 23, 2007

(54) PULSE LASER ARRANGEMENT AND METHOD FOR SETTING PULSE LENGTH FOR LASER PULSES

(75) Inventors: Guenter Hollemann, Jena (DE); Martin Leitner, Jena (DE); Jan Symanowski, Jena (DE)

(73) Assignee: Jenoptik Laser, Optik, Systeme GmbH, Jena (DE)

( * ) Notice: Subject to any disclaimer, the term of this patent is extended or adjusted under 35 U.S.C. 154(b) by 146 days.

(21) Appl. No.: 10/521,088

(22) PCT Filed: Jul. 10, 2003

(86) PCT No.: PCT/DE03/02359

§ 371 (c)(1),
(2), (4) Date: Sep. 23, 2005

(87) PCT Pub. No.: WO2004/010550

PCT Pub. Date: Jan. 29, 2004

(65) Prior Publication Data

US 2006/0126676 A1    Jun. 15, 2006

(30) Foreign Application Priority Data

Jul. 12, 2002    (DE) ................................ 102 32 124

(51) Int. Cl.
*H01S 3/11* (2006.01)
*H01S 3/10* (2006.01)
*H01S 3/14* (2006.01)

(52) U.S. Cl. .............................. 372/10; 372/25; 372/68

(58) Field of Classification Search ............... 372/10, 372/25, 68, 30
See application file for complete search history.

(56) References Cited

U.S. PATENT DOCUMENTS 3,986,130 A * 10/1976 Soures et al. ............... 359/349

OTHER PUBLICATIONS

R. Iffländer, Solid state Lasers for Materials Processing, Springer Series in Optical Sciences, Springer Verlag, Berlin (2001) pp. 28-32.

* cited by examiner

*Primary Examiner*—Armando Rodriguez
(74) *Attorney, Agent, or Firm*—Reed Smith LLP

(57) ABSTRACT

The object of a pulsed laser arrangement and a method for adjusting the pulse length of laser pulses is to change the pulse length over a wide range substantially independent from the laser output power, in particular to counteract a reduction in output and to prevent a negative change in the beam parameters when lengthening the pulse by means of varying the oscillator output. A multistage laser amplifier in which an amplifying medium with a small-signal amplification of more than 10 is provided in every stage (17-22) is arranged downstream of a diode-pumped Q-switched solid state laser oscillator with variable oscillator output for supplying oscillator pulses. The total small-signal amplification brought about by all of the amplifying media is greater than 1000. The pulsed laser arrangement and the method can be used for industrial and medical purposes requiring pulse lengths in the range of several hundred ns to several μs at pulse repetition rates between 10 kHz and 200 khz.

7 Claims, 4 Drawing Sheets

PULSE LASER ARRANGEMENT AND METHOD FOR SETTING PULSE LENGTH FOR LASER PULSES

CROSS-REFERENCE TO RELATED APPLICATIONS

This application claims priority of PCT Application Ser. No. PCT/DE2003/002359 filed Jul. 10, 2003 and German Application No. 102 32 124.8, filed Jul. 12, 2002, the complete disclosures of which are hereby incorporated by reference.

BACKGROUND OF THE INVENTION a) Field of the Invention

The invention relates to the adjustment of pulse length in diode-pumped, Q-switched, solid state laser oscillators with variable oscillator output, particularly fundamental mode lasers with a high output power of more than 10 W.

b) Description of the Related Art

For many industrial or medical applications, it is advantageous to vary the pulse lengths and the pulse energy of a laser so as to be able to control its action in a deliberate manner. Pulse lengths in the range of several hundred ns to several µs at pulse repetition rates between 10 kHz and 200 kHz are particularly relevant. At present, the preferred medical application is in ophthalmology and the preferred industrial application is in laser separation of chips on silicon wafers or GaAs wafers. However, there is also an urgent need in the field of materials processing, e.g., for machining ceramics and diamonds, laser honing and laser drilling, although particularly short pulses below 10 ns are required in this case.

Many existing embodiment forms of continuously pumped acousto-optic, Q-switched, solid state laser oscillators, which primarily comprise lamp-pumped or transverse diode-pumped Nd:YAG rod lasers, typically achieve pulse lengths from 50 ns to 200 ns. The large pulse lengths can be achieved at low pump output and only at a high pulse repetition rate, but the short pulse lengths can be achieved only at a low pulse repetition rate. Pulse lengths greater than 200 ns cannot feasibly be produced in technical respects with these constructions because of the difficulty in achieving the transverse fundamental mode operation and due to a low pulse stability. Further, lasers of this kind can also only operate within a very limited parameter window.

While particularly high average outputs are achieved by end-pumped Nd:YVO$^4$ laser oscillators at repetition rates of 100 kHz, it is also the case here that the pulse length at a given cavity configuration (L, V, R, $P_{th}$) can only be varied by changing the pump output $P_p$ and, because of the correlation between pulse length and pulse energy, a drastic reduction in output power results when the pulse length is increased. This relationship is described in R. Ifflander, Solid state Lasers for Materials Processing, Springer Series in Optical Sciences, Springer Verlag, Berlin (2001), according to which the pulse length can be calculated from the parameters of pump output $P_p$, pump output at the laser threshold $P_{th}$, out-coupling coefficient R, loss factor V, and cavity length L by the following formula:

$$\tau = \frac{L}{c} \cdot \frac{P_p}{-\ln(V\sqrt{R})[P_p - P_{th} - P_{th}\ln(P_p/P_{th})]}.$$

Further, the change in the intra-cavity output due to the variation in pump beam output generally leads to a change in the thermal lens of the laser crystal, so that the beam parameters of the coupled-out beam also change. This effect is troublesome in many applications and, in particular, an anisotropically acting thermal lens leads to asymmetry in the beam profile.

A change in the repetition rate of the laser is also directly connected to a change in the pulse duration and output power. The pulse duration and the average output decrease at lower repetition rates.

Further, it is known from DE 199 58 566 A1 and DE 199 27 918 A1 to achieve a variation in pulse length in diode-pumped lasers with intra-cavity frequency doubling for medical applications by means of controlling the Q modulation.

It is disadvantageous that additional oscillator losses caused by the disruption of the pulse buildup lead to poor efficiency and that the highly nonlinear dynamics due to the exponential pulse rise result in a complicated solution with respect to control engineering.

OBJECT AND SUMMARY OF THE INVENTION

It is the primary object of the invention to change the pulse length over a wide range substantially independent from the laser output power, in particular to counteract a reduction in output and to prevent a negative change in the beam parameters when lengthening the pulse by means of varying the oscillator output.

According to the invention, this object is met by a pulse laser arrangement for generating laser pulses with adjustable pulse length, in which a diode pumped, Q-switched solid state laser oscillator is provided with variable oscillator output for supplying oscillator pulses, in that the Q-switched solid state laser oscillator is followed by a multistage laser amplifier in which an amplifying medium with a small-signal amplification of more than 10 is provided in every stage, wherein the total small-signal amplification brought about by all of the amplifying media is greater than 1000.

Due to the high small-signal amplification, which should be more than 1000, a pulse shaping and pulse widening takes place due to the changing inversion density in which there is no linear intensity peaking over the entire oscillator pulse but, rather, the leading edge of the oscillator pulse is amplified by the inversion, which is much greater in this case, much more than the trailing edge in which the inversion is already reduced. As a result, the pulse amplification is connected with a forward shift in time of the leading edge of the laser pulse relative to that of the oscillator pulse.

By means of the invention, the pulse length can be adjusted within an extremely wide range (200 ns to 2000 ns) as a result of the variation in the oscillator output by changing the pump beam output by means of the diode current, while the laser output power remains constant to a great extent. In this way, the high degree of small-signal amplification leads to the decoupling of the variation in the oscillator output from the laser output power.

It is advantageous to minimize the cross-sectional area of the amplifying medium that is proportional to the reciprocal of the small-signal amplification. In particular, the mode cross section of the mode-matched beams of the pump radiation and of the laser radiation to be amplified should be less than 0.5 mm$^2$ in this cross-sectional area in every amplifying medium.

In an advantageous construction, the solid state laser oscillator can contain as active medium an anisotropic laser crystal which is pumped by an asymmetric pump beam whose cross section has different dimensions perpendicular to one another and which is traversed by a laser beam cross section which is adapted to this asymmetry and which has an axial ratio in directions extending perpendicular to one another of greater than 1:1 and less than 1:3.

This can be achieved in that the axis of the crystallographic axes of the anisotropic laser crystal in whose direction the highest value of the crystal stress limit is present is oriented along the greatest temperature gradient located in direction of the smaller dimension of the pump beam cross section. The anisotropic laser crystal, which contains a crystal cross section which is traversed by the pump beam and which has crystal edges of different length oppositely located parallel to one another in pairs, has its greatest thermal expansion coefficient in the direction of the smaller dimension of the pump beam cross section and parallel to the crystal edge with the shorter edge length.

The above-stated object is further met, according to the invention, by a method for adjusting the pulse length in laser pulses by varying the output of a diode-pumped Q-switched solid state laser oscillator for providing oscillator pulses in that the oscillator pulses are supplied to a multistage laser amplifier and are amplified in every stage by a small-signal amplification of greater than 10, but at least with a total small-signal amplification of greater than 1000.

The invention accordingly provides a general-purpose tool for configuring the pulse length for a large number of application examples in industrial and medical fields by offering particularly short pulses, but also particularly long pulses, with a uniform pulse shape, high pulse peak outputs and a constantly high pulse repetition rate. Particularly noteworthy is the pulse stability in long pulses.

The invention will be described more fully in the following with reference to the schematic drawings.

DESCRIPTION OF THE PREFERRED EMBODIMENTS

Figure 1:
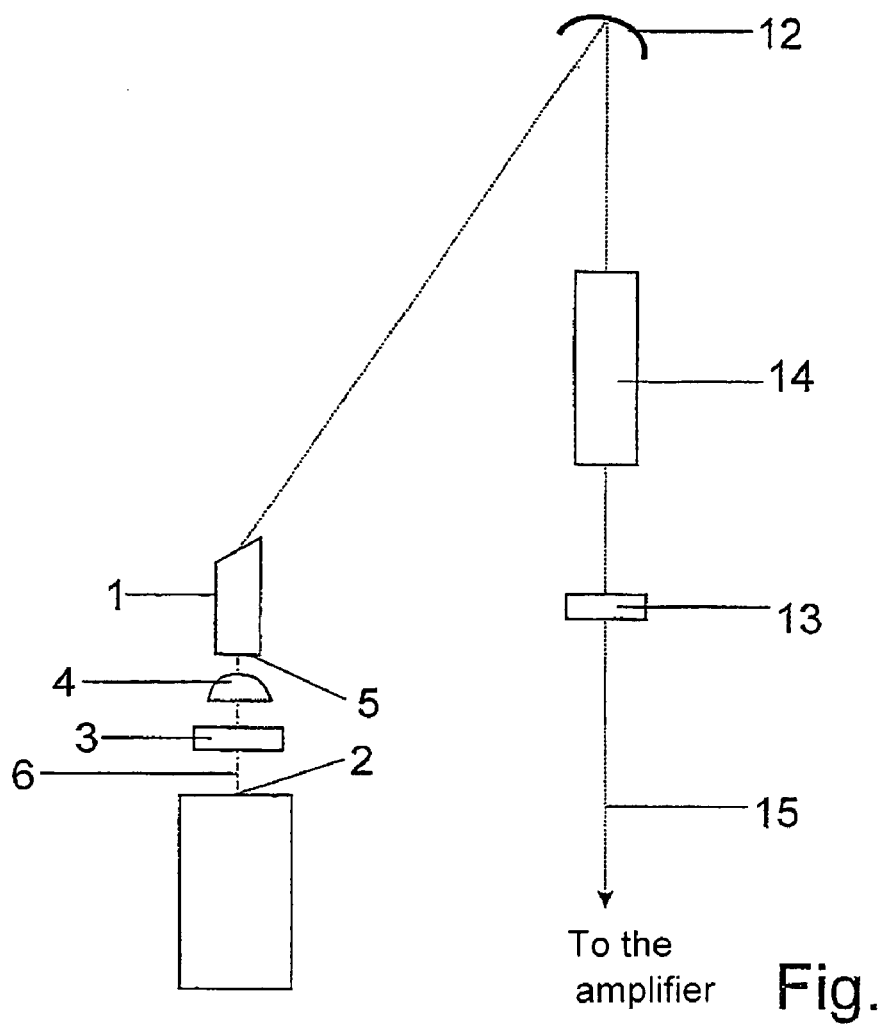
FIG. 1 shows the construction of a Q-switched solid state laser oscillator.

A Q-switched solid state laser oscillator, shown in FIG. 1, which is particularly suitable for the invention contains as laser crystal an Nd:YVO$^4$ crystal 1 that is pumped directly by a high-power diode laser 2 in the form of a diode laser array, a diode laser bar or an arrangement thereof. Imaging optics which are constructed for this purpose and which comprise two cylindrical lenses 3, 4 with cylinder axes extending perpendicular to one another transform the collimated pump light beam (808 nm) for spatial overlapping with the laser mode. The original focus-semiaxis ratio between the fast axis and the slow axis of about 1:20 is transformed into an asymmetric axial ratio of 1:2.3 and imaged on the Nd:YVO$^4$ crystal 1 with this asymmetric beam cross section. In contrast to beam transmission by means of light-conducting fibers, the direct free beam transmission of the pump beam that is provided results in a technically simple construction that is less prone to losses and has a higher load capacity.

Figure 2:
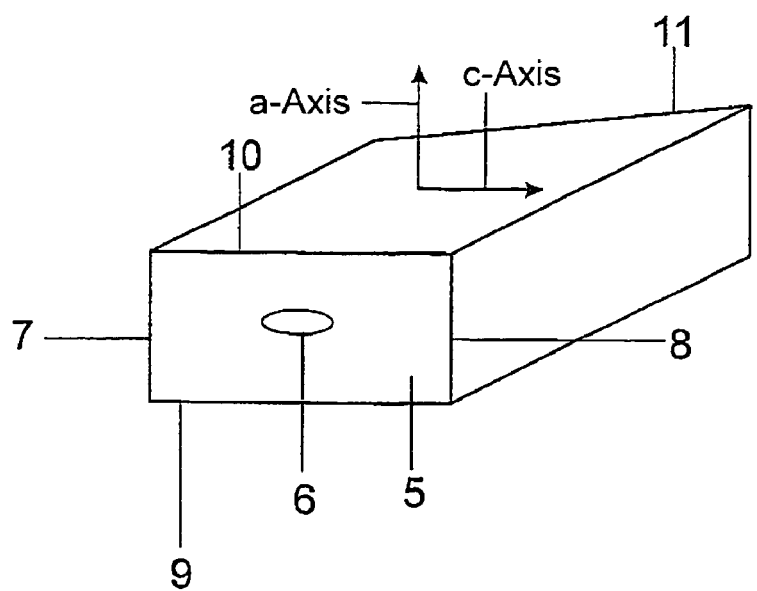
FIG. 2 shows the axial orientation in the anisotropic laser crystal.

According to FIG. 2, the anisotropic Nd:YVO$^4$ crystal 1 which is provided at its beam entrance face 5 facing the diode laser array 2 with an antireflection coating for the pump wavelength of 808 nm and a highly reflective coating system for the laser wavelength of 1064 nm is oriented to the pump beam 6 in such a way that its crystallographic c-axis is directed in the direction of the greater dimension of the pump beam cross section (parallel to the slow axis) and the crystallographic a-axis, in whose direction the highest value of the crystal stress limit and of the thermal expansion coefficient is present, is directed in the direction of the smaller dimension of the pump beam cross section (parallel to the fast axis).

It has been shown that the crystal strength can be substantially increased relative to a thermal stress by means of a reduction in the crystal height in direction of the a-axis and an increase in the temperature gradient connected with this. This means that the laser crystal 1 can be operated at substantially higher pump outputs and pump output densities than in previously known arrangements.

This requirement is met by the construction according to FIG. 2 in that the laser crystal has a crystal cross section traversed by the pump beam whose crystal edges 7, 8, 9 and 10 of different edge lengths are oppositely located parallel to one another in pairs, wherein crystal edges 7 and 8 have a shorter length than crystal edges 9 and 10 and extend in direction of the smaller dimension of the pump beam cross section.

As a result of the asymmetry of the heat flow brought about by the reduction in the crystal dimensions in direction of the smaller dimension of the pump beam cross section and the consequent asymmetry of the thermal lens, an elliptic laser beam cross section is generated in the interior of the crystal whose axial ratio of greater than 1:1 and less than 1:3 is adapted to that of the pump beam cross section without requiring additional astigmatic elements in the cavity, i.e., without having to employ different beam shaping means for the different axes.

Across from the beam entrance face 5, the laser crystal is provided with an end face 11 that is cut at a Brewster angle so that the axial ratio can be further increased by the factor of the ratio of the index of refraction of the laser crystal to the index of refraction of air. On the other hand, the elliptic laser cross section within the laser crystal has an approximately circular cross section when exiting from the crystal.

In addition to the reflecting beam entrance face 5, the solid state laser oscillator contains a beam folding mirror 12 adapted to the stability criteria of a cavity and an out-coupling mirror 13. In a first embodiment form in which pulses with larger pulse lengths of greater than 500 ns are to be generated, the two parameters influencing the pulse length, i.e., the cavity length and out-coupling coefficient, amount to 860 mm and 10%, respectively. In general, cavity lengths greater than 500 mm are suitable for longer pulses of this kind.

When the radius of curvature of the folding mirror 12 is reduced, the cavity length can be shortened and another construction of a solid state laser oscillator can be built for generating shorter pulses (less than 500 ns). With a cavity length of 240 mm, for example, the average output of the solid state laser oscillator can be varied from 2.0 W to 3.2 W with the beam quality ($M^2$<1.1) remaining unchanged, which results in pulse lengths in the range of 30 ns at repetition rates of 30 kHz.

Naturally, the solid state laser oscillator can also be designed with cavity lengths far below 180 mm in order to achieve pulse lengths of less than 15 ns.

A Q-switch in the form of an acousto-optic switch 14 is arranged between the folding mirror and the out-coupling mirror 12, 13 for generating pulses.

The cavity configuration is selected in such a way that the change in the thermal lens in the laser crystal caused by an output variation of the pump beam ($\Delta P=2$ W) does not result in a change in beam quality ($M^2 \leqq 1.1$) and, in addition, the diameter of the coupled out laser beam is changed at most by 15%. The oscillator output can be changed within a range of 0.8 W to 1.4 W, which leads to pulse durations of 1900 ns to 360 ns behind the amplifier at a repetition rate of 30 kHz.

The repetition rate can be adjusted by controlling the acousto-optic switch 14 within a range of 10 kHz to 200 kHz.

The beam parameters of the laser beam 15 exiting from the solid state laser oscillator are matched to a laser amplifier arranged downstream (FIG. 3) by a lens combination 16 (mode matching); in particular, the laser beam cross section is transformed into an elliptic beam cross section with a low semiaxis ratio (1:2 to 1:3). Due to the invariance of the beam quality and the minor (15%) change in the beam diameter, it can be ensured that this matching is guaranteed at different pump outputs and output powers. This is the condition under which the pulse length variation of the amplified beam brought about by varying the output of the solid state laser oscillator can be realized.

Figure 3:
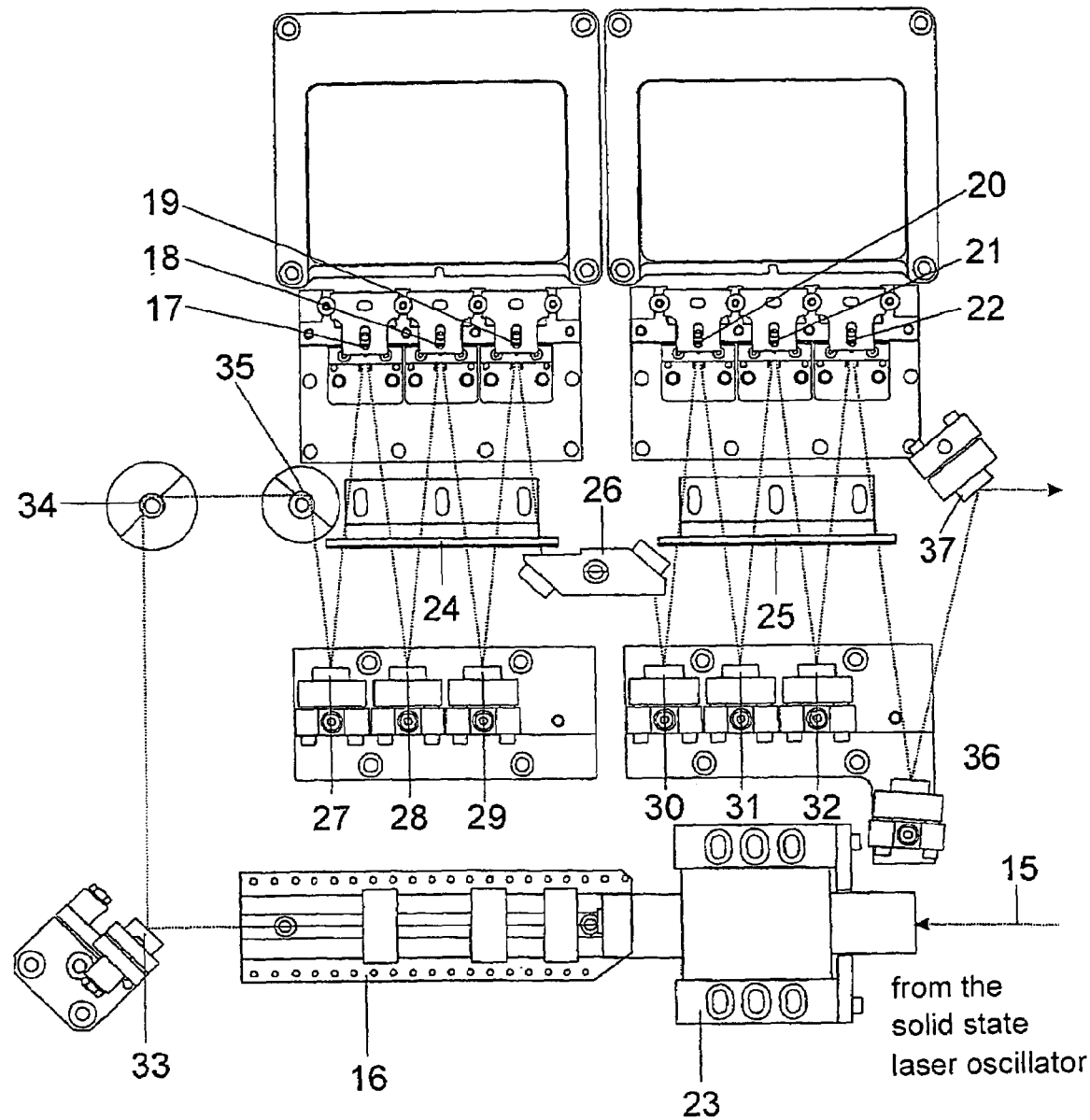
FIG. 3 shows a laser amplifier which is arranged downstream of the Q-switched solid state laser oscillator.

The laser amplifier shown in FIG. 3 (output power 50 W) whose individual amplifier stages have already been described extensively in DE 100 43 269 A1, referenced herein, comprises six amplifier stages of this kind with a series arrangement of six laser crystals 17-22 which are diode-pumped by as many associated high-power diode lasers (not shown in FIG. 3). The pump beam exiting from the high-power diode lasers is initially collimated and subsequently focused in the laser crystals 17-22. Due to the high beam quality of the pump beam in the fast axis direction, a highly elliptic pump focus is formed with dimensions of about 0.1 mm×2.0 mm which, at an absorbed pump output of 12 W, results in a very high pump output density and, therefore, in a high small-signal amplification. This amounts to greater than 10 per amplifier stage, so that the six amplifier stages give a total small-signal amplification of more than $10^6$.

In order to prevent feedback from the laser amplifier in the solid state laser oscillator, the circular laser beam 15 exiting from the solid state laser oscillator traverses a Faraday isolator 23 and, expanded by the lens combination 16, subsequently penetrates all six laser crystals 17-22 successively in a zigzag path. In addition, the laser beam 15 is focused in the laser crystals 17-22 for further matching to the highly elliptic pump focus by means of cylindrical lenses 24, 25, so that the laser beam 15 collimated in the tangential plane traverses the laser crystals 17-22 in the sagittal plane with a highly elliptic focus. The present laser amplifier comprises two parts that are optically connected by a periscope 26.

After its second pass through the cylindrical lens 29, the laser beam is collimated again also in the sagittal plane with the same elliptic cross section as before the first pass through the cylindrical lens 29.

Accordingly, the laser crystals 17-22 are penetrated by mode-matched beams of the pump radiation and of the laser radiation 15 to be amplified and a thermal lens with varying thickness in planes perpendicular to one another is formed as a result of the radiated pump beam. The laser radiation 15, focused in the plane with the thicker thermal lens, is directed into each of the laser crystals 17-22 and a beam waist forms in the area of the thermal lens.

Folding mirrors 27-32 which can also be used to adapt the beam dimensions in the slow-axis direction serve to ensure the zigzag path. Additional deflecting elements 33-37 are used for building a compact arrangement.

After exiting from the laser amplifier, the laser beam 15 is adapted to the desired beam parameters for the intended application by means of a lens arrangement, not shown, comprising four cylindrical lenses and an expansion telescope.

Figure 4:
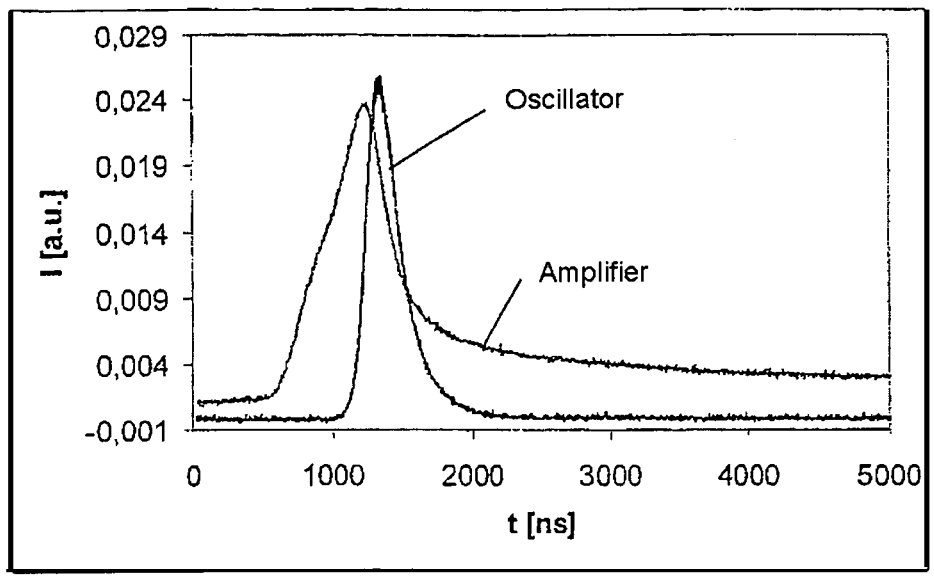
FIGS. 4, 4a show different pulse shapes at the outputs of the solid state laser oscillator and of the laser amplifier that are generated by means of the arrangement, according to the invention, comprising a low-power oscillator and an amplifier with a very high small-signal amplification.
Figure 4A:
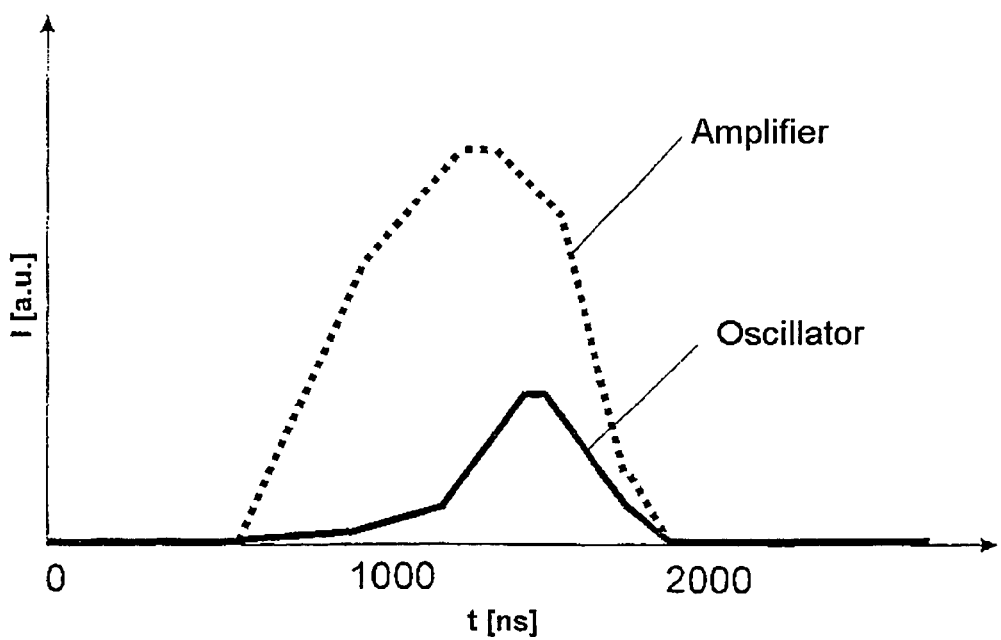

FIG. 4, and particularly FIG. 4a, in which the Q-switched oscillator pulse is preceded by an exponential rise in the leading edge, indicated in an exaggerated manner, show how the leading edge of the laser pulse at the output of the laser amplifier leads that of the oscillator pulse in time within the ns range. This is caused by the high small-signal amplification of the laser amplifier, whereby even very small oscillator outputs in the μW range are sufficient at a very early phase of pulse buildup to form a considerable portion of the leading edge of the amplifier pulse, so that the amplifier is already highly saturated very early on—in the present case, before reaching the pulse maximum of the oscillator—and the pulse maximum is already exceeded. The pulse is therefore longer.

But overall, in addition to the apparent leading of the amplifier pulse, this results above all in the pulse widening which is adjustable, according to the invention, by means of the proposed arrangement.

Figure 5:
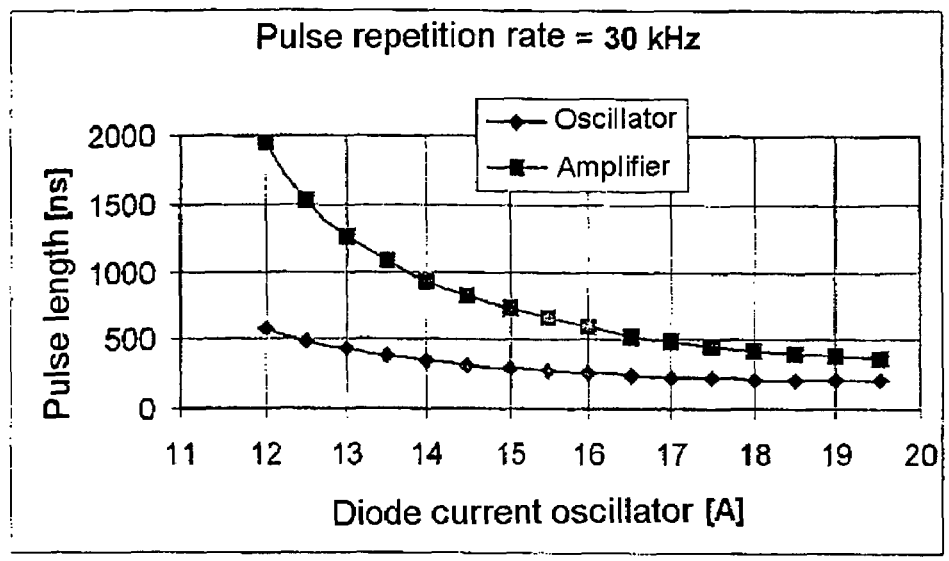
FIG. 5 is a graph showing the behavior of the pulse length at the output of the solid state laser oscillator and at the output of the laser amplifier as a function of the diode current of the pump beam source for the solid state laser oscillator and, therefore, as a function of the oscillator output.

FIG. 5 shows this time increase in the pulses as a result of the amplification process with high small-signal amplification, wherein the pump beam output in the solid state laser oscillator is changed over a very wide range, while the pump beam output in the laser amplifier remains constant.

Figure 6:
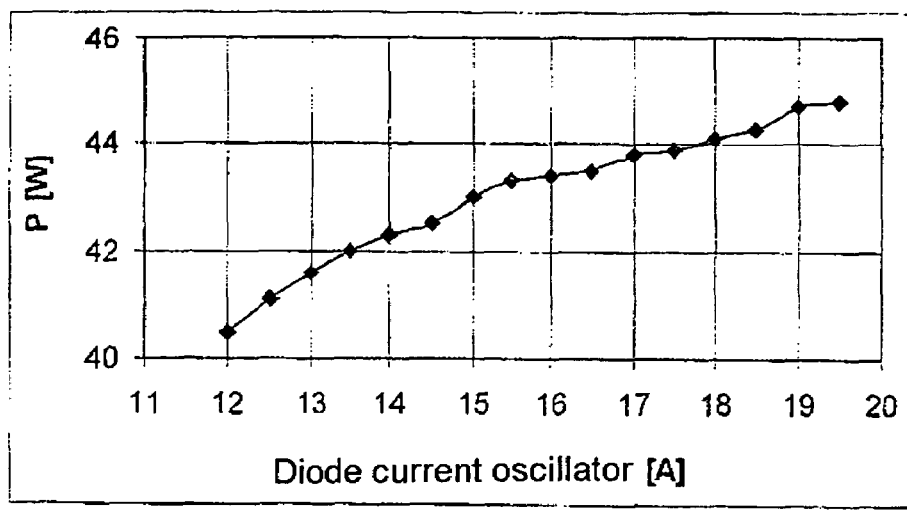
FIG. 6 is a graph showing the behavior of the laser output power as a function of the diode current of the pump beam source for the solid state laser oscillator and, therefore, as a function of the oscillator output.

FIG. 6 demonstrates the small degree of change in output power (10%) at the amplifier output when varying the oscillator output due to the attenuation of the drop in output by means of the amplification.

While the foregoing description and drawings represent the present invention, it will be obvious to those skilled in the art that various changes may be made therein without departing from the true spirit and scope of the present invention.

The invention claimed is:

1. A pulsed laser arrangement for generating laser pulses with adjustable pulse length comprising:
   a diode-pumped, Q-switched solid state laser with variable oscillator output is provided for supplying oscillator pulses;
   a multistage laser amplifier in which an amplifying medium with a small-signal amplification of more than 10 being provided in every stage which is arranged downstream of the Q-switched solid state laser oscillator; and wherein the total small-signal amplification brought about by all of the amplifying media is greater than 1000.

2. The pulsed laser arrangement according to claim 1, wherein mode-matched beams of a pump radiation and of the laser radiation to be amplified have a mode cross section of less than 0.5 mm$^2$ in every amplifying medium.

3. The pulsed laser arrangement according to claim 1, wherein solid state laser oscillator contains as active medium an anisotropic laser crystal which is pumped by an asymmetric pump beam whose cross section has different dimensions perpendicular to one another and which is traversed by a laser beam cross section which is adapted to this asymmetry and which has an axial ratio in directions extending perpendicular to one another of greater than 1:1 and less than 1:3.

4. The pulsed laser arrangement according to claim 3, wherein an axis of the crystallographic axes of the anisotropic laser crystal in whose direction the highest value of the crystal stress limit is present is oriented along the greatest temperature gradient located in direction of the smaller dimension of the pump beam cross section.

5. The pulsed laser arrangement according to claim 4, wherein the anisotropic laser crystal, which contains a crystal cross section which is traversed by the pump beam and which has crystal edges of different length oppositely located parallel to one another in pairs, has its greatest thermal expansion coefficient in the direction of the smaller dimension of the pump beam cross section and parallel to the crystal edge with the shorter edge length.

6. A method for adjusting the pulse length of laser pulses comprising the steps of:

varying the output of a diode-pumped Q-switched solid state laser oscillator for providing oscillator pulses, including the further step of supplying the oscillator pulses to a multistage laser amplifier and amplifying them in every stage by a small-signal amplification of greater than 10, but at least with a total small-signal amplification of greater than 1000.

7. The method according to claim 6, wherein the pulse length is adjusted by changing a pump beam output by means of a diode current of the pump beam source.

* * * * *